Figure 1:
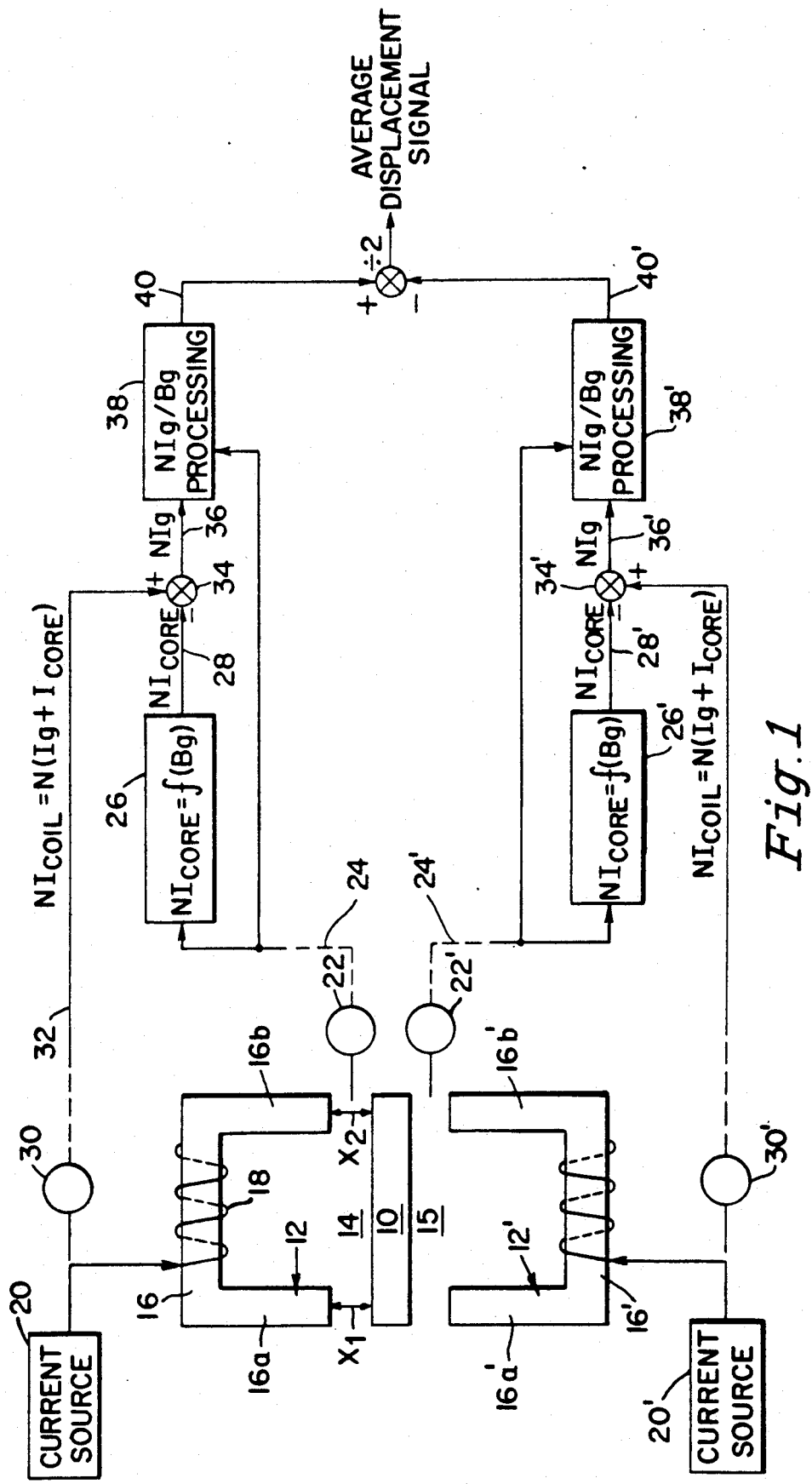

United States Patent
Bardas et al.

[11] Patent Number: 5,115,192
[45] Date of Patent: May 19, 1992

[54] MAGNETIC DISPLACEMENT TRANSDUCER WITH SATURATION COMPENSATION

[75] Inventors: Theodor Bardas; Jules Eisenbart; Tim Harris; Cal Oleksuk, all of Calgary, Canada

[73] Assignee: NOVA Corporation of Alberta, Calgary, Canada

[21] Appl. No.: 609,646

[22] Filed: Nov. 6, 1990

[51] Int. Cl.⁵ .................... G01B 7/14; G05D 3/00
[52] U.S. Cl. .................... 324/207.12; 318/653; 324/207.13; 324/207.16; 324/207.25
[58] Field of Search .............. 324/207.12–207.14, 324/207.17, 207.20, 207.21, 207.25, 207.26, 223, 229, 230, 235; 310/68 B, 90.5; 318/653, 798; 361/143

[56] References Cited
U.S. PATENT DOCUMENTS

| | | | |
|---|---|---|---|
| 2,320,761 | 6/1943 | Tait et al. | 324/230 X |
| 3,365,660 | 1/1968 | Steingroever | 324/223 X |
| 4,507,609 | 3/1985 | Madewell | 324/230 |
| 4,804,912 | 2/1989 | Lysen | 324/207.17 |

Primary Examiner—Gerard R. Strecker
Attorney, Agent, or Firm—Stevens, Davis, Miller & Mosher

[57] ABSTRACT

A displacement transducer suitable for use in a magnetic bearing measures the flux density between a pair of components and divides a signal indicative of the magnetomotive force between the components by the flux density signal to obtain a signal indicative of displacement.

9 Claims, 2 Drawing Sheets

MAGNETIC DISPLACEMENT TRANSDUCER WITH SATURATION COMPENSATION

The present invention relates to a device which can measure the proximity or displacement of one surface to another in the presence of a magnetic field.

Known non-contacting displacement measuring devices provide position information by measuring changes in an electromagnetic field, acoustic propagation delays or angle changes in optical reflection, while the device is mounted on one surface and looking at the other.

The displacement measuring device is also called a proximity sensor and is sometimes connected to an electronic demodulator or processing circuit called a proximitor. The proximity sensors are fabricated in various shapes and sizes with the most popular in a rod or cylindrical shape.

The measurement of small displacements with a high resolution is usually accomplished with inductive or eddy current type proximity sensors. With inductive sensors, the changing air gap to the measured surface from the sensor changes the sensor's coil inductance. Inductance changes can then be calibrated to define the air gap. This method of measurement depends on ferromagnetic properties of the measured surface. The eddy current type of sensor contains a coil which is part of a high frequency tuned circuit. A reduced air gap between the coil and the conductive measured surface increases eddy current losses and changes the damping of the circuit. This change in damping can be calibrated to define the gap. This method does not require ferromagnetic properties of the measured surface. Differential or bridge arrangements of circuits are used to enhance the linearity and accuracy of either the inductive or eddy current proximity measurement.

Both the inductive and eddy current proximity systems have the inherent property that their accuracy depends on the absence of outside electromagnetic fields. This makes the use of these proximitors unsuitable for applications subjected to such fields, i.e. magnetic bearings, motors and other magnetic field dependent equipment.

With known transducers, it is therefore necessary to separate physically these proximity sensors from the active electromagnetic field. As a consequence, the location at which displacement is measured does not coincide with the location of the magnetic field. This can have a detrimental effect if the displacement measured at the proximitor differs from that at the magnet when the displacement measurement is to be used for control of the gap at the magnetic field. For example, in a magnetic bearing the displacement of a shaft relative to the pole pieces must be closely monitored to avoid mechanical failure and if the shaft is subjected to a bending load, the remote location of the proximity sensor may result in an inaccurate measurement of the gap between the shaft and pole piece.

It has been proposed to utilize a fluix measuring device such as a Hall effect transducer to obtain a signal indicative of the changes in the gap. However, where the magnetic field may vary as well as the gap being measured, the signal so obtained does not relate directly to variations in the gap and is adversely affected by non-linearities in the core.

It is therefore an object of the present invention to provide a transducer that may be utilized within a varying magnetic field that obviates or mitigates the above disadvantages.

According to the invention there is provided a displacement transducer for monitoring the displacement between a pair of components comprising a magnetomotive force generating means to establish a magnetic flux between the components, flux measuring means to provide a signal indicative of the flux density between the components and signal processing means to divide a signal indicative of the magnetomotive force between the components by the flux density signal to provide a signal indicative of displacement.

The flux density between the components may be determined by a known transducer such as a Hall effect transducer and the magnetomotive force between the components computed from the magnetomotive force generating means. Where an electro-magnet is used as the magnetomotive force generator, the current supplied to the coil may be monitored and processed to obtain a signal indicative of the magnetomotive force between the components.

Non-linearity between the current supplied to the coil and the magnetomotive force between the components that may result for core saturation effects may be avoided by modifying the signal supplied to compute the magnetomotive force between the components in accordance with a predetermined relationship. Thus, in one example, the relationship between flux density between the components and the saturation effects in the core may be determined and the flux density signal used to generate a modified signal from which the magnetomotive force in the gap may be generated.

Figure 2:
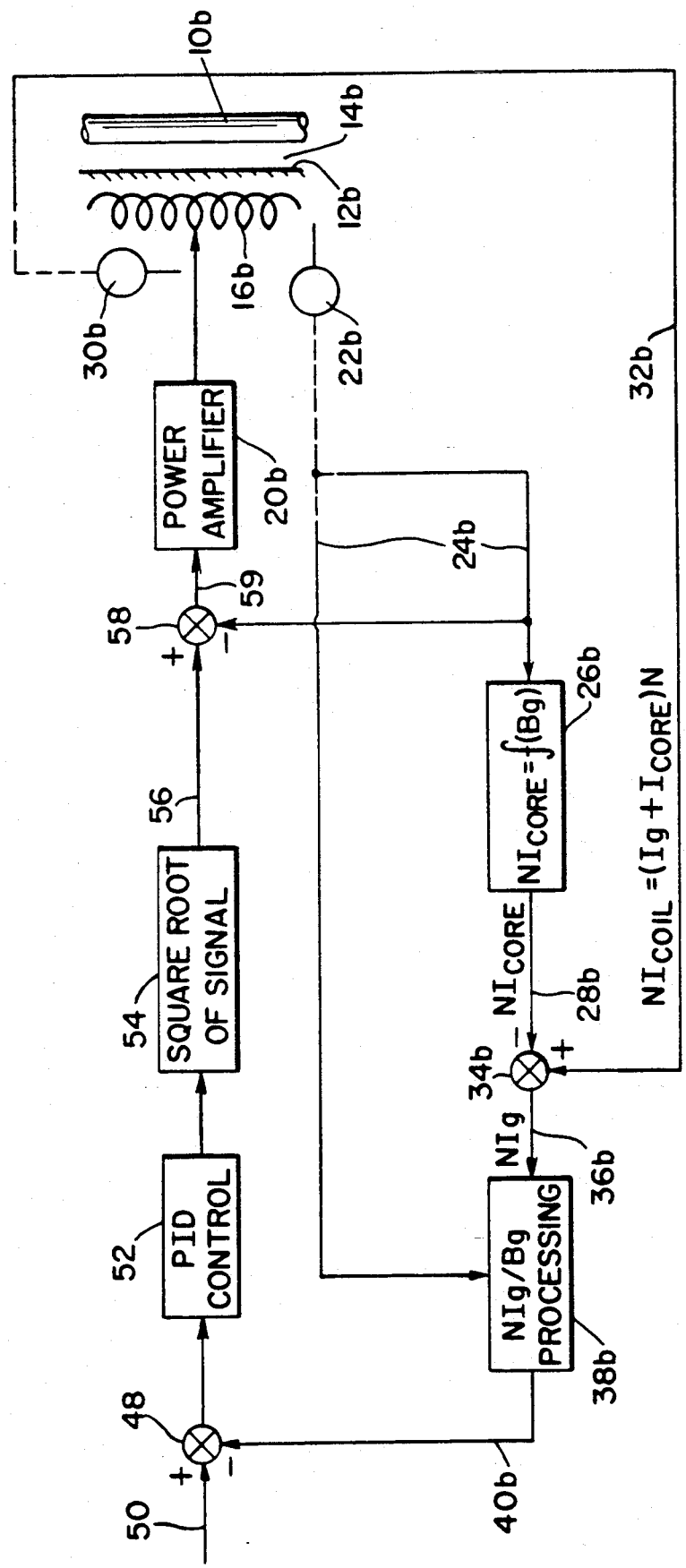

Embodiments of the present invention will now be described by way of example only with reference to the accompanying drawings in which:

FIG. 1 shows in schematic form the implementation of a displacement transducer utilizing an electro-magnet; and FIG. 2 shows the application of the transducer of FIG. 1 to a magnetic bearing control.

Referring therefore to FIG. 1, a pair of relatively moveable components 10,12 are separated by air gaps 14,15. It will be understood that the components 10,12 are shown schematically and may be, for example, a shaft and housing of a rotary magnetic bearing or the stator and reaction rail of a linear induction motor. Component 12 is formed as a magnetic core 16 having a pair of spaced pole pieces 16a,16b. Similarly, a second component 12' is formed as a magnetic core 16' having a pair of spaced pole pieces 16'a and 16'b. A coil 18 is wound about the core 16 and is supplied with electrical current from a suitable source 20 so that a magnetic circuit is established through the core 16, air gap 14 and moveable component 10.

The magnetic flux density in the gap 14 is measured by a Hall effect transducer 22 which produces an output signal 24. Signal 24 is modified by a signal processor 26 which is calibrated to provide an output signal 28 indicative of the magnetomotive force in the core 16 (NIcore) for a given value of flux density as will be described more fully below.

The current supplied to the coil 18 is measured by a current transducer 30 having an output signal 32. The magnetomotive force generated by the coil 16 is proportional to the product of the current supplied to the coil and the number of turns in the coil. Since the number of turns is constant, the current signal 32 is indicative of the magnetomotive force generated by the coil 18, identified as "$NI_{coil}$".

It will be appreciated that the magnetomotive force generated by the coil 18 produces magnetomotive forces in the core 16 and in the gap 14, the sum of which is equal to the magnetomotive force of the coil 18; i.e.

$$NI_{coil} = NI_{gap} + NI_{core}$$

Thus the current signal 32 has components indicative of the magnetomotive force in both the gap and the core.

As noted above, signal 28 is indicative of the magnetomotive force in the core 16 ($NI_{core}$) so that the difference between signals 32 and 28 is indicative of the magnetomotive force $NI_{gap}$ in the gap 14. Signals 32 and 28 are therefore subtracted at 34 to provide a signal 36 indicative of the magnetomotive force in the gap [($NI_{gap} + NI_{core}) - NI_{core}$] and which is applied as one input to a divider 38.

Signal 24 indicative of the flux density $B_{gap}$ provides a second input to the divider 38 whose output signal 40 is the division of signal 36 by signal 24. Thus, $$\text{signal } 40 = \frac{\text{signal } 36}{\text{signal } 24} = \frac{NI_{gap}}{B_{gap}}$$

Changes in signal 40 are therefore indicative of relative displacement between the components 10,12 as the measurement of gap 14 is proportional to the magnetomotive force in the gap divided by the flux density in the gap.

As shown in FIG. 1, a complementary transducer 22' is provided for gap 15 to produce a second signal 40, with the difference between the two signals 40,40, being provided as the indication of changes in the gaps 14,15. Such differential configurations of transducer are of course well known in general and will not be described further.

In operation, therefore, movement of component 10 relative to component 12 produces a change in flux density in the gaps 14,15 which is detected by transducer 22,22' to produce new signals 24,24'. The new signal is processed by processor 26,26' to provide a revised value for $NI_{core}$ as signal 28,28'. As the current in coil 16 has remained constant, the change in signal 28 produces a new input signal 36 to divider 38 and a change in output signal 40 indicative of the displacement between components 10 and 12.

As noted above, the relationship between flux density and magnetomotive force in the core 16 is determined by processor 26. The relationship between these values may be determined by maintaining the gap 14 constant and varying the current to coil 16 while the flux density is measured. As noted above, $$NI_{coil} = NI_{core} + NI_{gap}$$

and $$NI_{gap} = \frac{B_{gap}(X_1 + X_2)}{u_o}$$

where $B_{gap}$ is flux density in gap 14
$X_1$ and $X_2$ are the measurement of gap 14 at the spaced locations of the pole pieces 16a,16b respectively
and $u_o$ is permeability of free space (i.e. a constant). Therefore, $$NI_{core} = NI_{coil} - \frac{B_{gap}(X_1 + X_2)}{u_o}$$

Since $NI_{coil}$ can be determined by the current transducer 30 and $B_{gap}$ measured by transducer 22, holding $X_1$ and $X_2$, i.e. the gap, constant while varying the current allows values of $NI_{core}$ to be computed for a range of values of B. Processor may thus take the form of look up tables or hardware to implement the function between $B_{gap}$ and $NI_{core}$ if it can be easily modelled. In this manner, a unique value of $NI_{core}$ can be obtained for each value of input signal 24 which reflects the B/H relationship of the ferromagentic components.

It will be seen therefore that the displacement transducer monitors the displacement at the magnetic field location through the use of a single transducer that may be accommodated in the gap and that is not adversely affected by varying magnetic fields.

The transducer shown in FIG. 1 is particularly suitable for incorporation into a control system for a magnetic bearing as shown in FIG. 2 where like reference numerals will be used to identify components common to figure 1 with a suffix 'b' added for clarity. Component 10b constitutes a shaft which is supported for rotation relative to a housing 12b by the electromagnet 16b. The shaft 10b and housing 12b are separated by air gap 14b and the current to the electromagnet 16b varied by power amplifier 20b to maintain the gap 14b at a predetermined value. In this manner, as the load on the shaft 10b varies, the position of the shaft may be maintained at a desired datum.

The flux density in air gap 14b is measured by transducer 22b and processed by processor 26b to provide a signal 28b indicative of the core magnetomotive force. Current signal 32b is provided through transducer 30b from the current supply to the bearing and provides a signal indicative of the magnetomotive force for the gap and the core. Signal 28b which is indicative of the core magnetomotive force, is substratcted from signal 32b to provide signal 36b indicative of the magnetomotive force in the gap. Signal 36b is then applied to the input of divider 38b. Output signal 40b is fed to a comparator 48 which also receives a reference signal 50 indicative of the datum position of shaft 12. Although not shown, a complementary signal path may be provided for the gap 15 as shown in FIG. 1 with the signal 40'b being provided to comparator 48. The difference between signals 50 and 40b,40b' produces an error signal which is used by PID control 52 and square root function 54 to provide a control output signal 56 supplied to comparator 58. A negative feedback loop is provided by signal 24b to comparator 58. Comparator 58 substracts the negative feedback provided by signal 24b form the control output signal 56, and produces amplifier control signal 59. Signal 59 is applied to the input of amplifier 20b. By providing a negative feedback loop, the control o the magnetic field is directly proportional to the control output signal 56.

It will be apparent therefore that excursions of the shaft 10b from the datum produce a signal from the displacement transducer which may be used to vary the current to the bearing and return the shaft to the datum in the desired manner.

We claim:

1. A displacement transducer for monitoring the displacement between a pair of components comprising a magnetomotive force generating means to establish a magnetic flux between the components, flux measuring means to provide a signal indicative of the flux density between said pair of components, a magnetomotive force measuring means, wherein said magnetomotive force measuring means produces a second signal indicative of the magnetomotive force which establishes said magnetic flux, a first signal processing means to process, according o a predetermined relationship, said first signal to provide a third signal indicative of the magnetomotive force produced by the magnetic flux established by said magnetomotive force generating means, means to subtract said third signal from said second signal wherein said subtraction provides a fourth signal indicative of the magnetomotive force existing between said pair of components, and a second processing means to divide said fourth signal by said first signal wherein said division produces a fifth signal indicative o the displacement between said pair of components.

2. A transducer according to claim 1 wherein said force generating means is an electromagnet having a coil and a cone.

3. A transducer according to claim 2 wherein the signal indicative of the magnetomotive force between the components is derived from signals indicative of the magnetomotive force in the coil and core respectively.

4. A transducer according to claim 3 wherein current supplied to the coil is monitored to provide said coil magnetomotive force signal.

5. A transducer according to claim 3 wherein said flux density signal is monitored to provide said core magnetomotive force signal.

6. A transducer according to claim 3 wherein said coil and core magnetomotive force signals are subtracted to provide said signal indicative of the magnetomotive force between the components.

7. A transducer according to claim 5 in which to each value of flux signal a respective value of core magnetomotive force signal is determined according to the B/H relationship of the ferromagnetic components.

8. A transducer according to claim 7 wherein the respective value of the core magnetomotive force signal is determined according to the B/H relationship of the ferromagnetic components.

9. A displacement transducer according to claim 1 wherein said pair of components consist of the shaft and the housing of a rotary magnetic bearing.

* * * * *